(12) United States Patent
Brill et al.

(10) Patent No.: US 11,409,992 B2
(45) Date of Patent: Aug. 9, 2022

(54) DATA SLICING FOR MACHINE LEARNING PERFORMANCE TESTING AND IMPROVEMENT

(71) Applicant: International Business Machines Corporation, Armonk, NY (US)

(72) Inventors: Rachel Brill, Haifa (IL); Eitan Farchi, Pardes-Hana (IL); Orna Raz, Haifa (IL); Aviad Zlotnick, Mitzpeh-Netofa (IL)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 16/435,648

(22) Filed: Jun. 10, 2019

(65) Prior Publication Data
US 2020/0387753 A1     Dec. 10, 2020

(51) Int. Cl.
| | | |
|---|---|---|
| *G06V 10/774* | (2022.01) | |
| *G06K 9/62* | (2022.01) | |
| *G06N 20/00* | (2019.01) | |
| *G06V 10/778* | (2022.01) | |

(52) U.S. Cl.
CPC ......... *G06K 9/6257* (2013.01); *G06K 9/6264* (2013.01); *G06N 20/00* (2019.01); *G06V 10/7747* (2022.01); *G06V 10/7788* (2022.01)

(58) Field of Classification Search
CPC ........... G06V 10/7747; G06V 10/7788; G06N 20/00; G06N 20/20
See application file for complete search history.

(56) References Cited

U.S. PATENT DOCUMENTS

| | | | |
|---|---|---|---|
| 8,086,640 | B2 | 12/2011 | Grichnik et al. |
| 2015/0379429 | A1 | 12/2015 | Lee et al. |
| 2016/0246838 | A1 | 8/2016 | Li et al. |
| 2018/0365229 | A1 | 12/2018 | Buhrmann et al. |
| 2019/0318269 | A1* | 10/2019 | Ezen Can ............. G06F 40/205 |
| 2020/0320349 | A1* | 10/2020 | Yu ......................... H04L 9/3239 |
| 2020/0349395 | A1* | 11/2020 | Nushi .................. G06K 9/6257 |

OTHER PUBLICATIONS

Barash1, et al. Bridging the gap between ML solutions and their business requirements using combinatorial testing. Western Digital, Israel. IBM Research, Israel. pp. 1-8.

* cited by examiner

*Primary Examiner* — Daniel G Mariam
(74) *Attorney, Agent, or Firm* — Ziv Glazberg

(57) ABSTRACT

A method and a computer program product for identification and improvement of machine learning (ML) under-performance The method comprises slicing data of ML model based on a functional model representing requirements of a system utilizing the ML model. The functional model comprises a set of attributes and respective domain of values. Each data slice is associated with a different valuation of one or more attributes of the functional model. Each data instance of the ML model is mapped to one or more data slices, based on valuation of the attributes. A performance measurement of the ML model over is computed for each data slice, based on an application of the ML model on each data instance that is mapped to the data slice. A Determination whether ML model adheres to a target performance requirement may be performed based on the performance measurements of the data slices.

16 Claims, 6 Drawing Sheets

DATA SLICING FOR MACHINE LEARNING PERFORMANCE TESTING AND IMPROVEMENT

TECHNICAL FIELD

The present disclosure relates to machine learning testing in general, and to identification and improvement of machine learning under-performance, in particular.

BACKGROUND

Machine learning based solutions are becoming increasingly popular and pervasive. Many computer systems utilize machine learning models to effectively perform a specific task without using explicit instructions, relying on patterns and inference instead. Machine learning algorithms are used in a wide variety of applications, such as email filtering, and computer vision, where it is infeasible to develop an algorithm of specific instructions for performing the task.

Different performance and accuracy metrics may be utilized to evaluate the performance of machine learning models, such as F1-score, accuracy or the like. Accuracy may be measures as the percentage of total items classified correctly. F1-Score is a harmonic mean of precision (e.g., the number of items correctly identified as positive out of total items identified as positive) and recall (e.g., the number of items correctly identified as positive out of total true positives).

BRIEF SUMMARY

One exemplary embodiment of the disclosed subject matter is a method comprising: obtaining a functional model representing system requirements of a system utilizing a machine learning prediction model. The machine learning prediction model may be configured to provide an estimated prediction based on a valuation of a feature vector. The functional model may comprise a set of attributes, each of which having a respective domain of values. The set of attributes may comprise at least one metadata-based attribute that is not comprised in the feature vector. The method further comprises determining a set of data slices based on the functional model. Each data slice of the set of data slices may be associated with a different valuation of one or more attributes of the functional model. The method further comprises obtaining testing data instances. Each testing data instance may comprise raw data and a label. The raw data comprise metadata. The method further comprises determining, for each testing data instance, based on the raw data, values for each attribute of the functional model. Said determining the values may comprise utilizing the metadata of the testing data instance, whereby mapping the testing data instance to one or more data slices. The method further comprises computing, for each data slice, a performance measurement of the machine learning prediction model over the data slice. Said computing may be based on an application of the machine learning prediction model on each testing data instance that is mapped to the data slice, whereby computing for each data slice a different performance measurement. The method further comprises determining whether the machine learning prediction model adheres to a target performance requirement based on the performance measurements of the data slices.

Another exemplary embodiment of the disclosed subject matter is a method comprising: obtaining a functional model representing system requirements of a system. The system may be capable of utilizing a plurality of machine learning prediction models, each of which is configured to provide an estimated prediction based on a valuation of a feature vector. The functional model may comprise a set of attributes, each of which having a respective domain of values. The set of attributes may comprise at least one metadata-based attribute that is not comprised in the feature vector. The method further comprises determining a set of data slices based on the functional model. Each data slice of the set of data slices may be associated with a different valuation of one or more attributes of the functional model. The method further comprises obtaining testing data instances. Each testing data instance may comprise raw data and a label, wherein the raw data comprises metadata. The method further comprises determining, for each testing data instance, based on the raw data, values for each attribute of the functional model. Said determining the values comprises utilizing the metadata of the testing data instance, whereby mapping the testing data instance to one or more data slices. The method further comprises computing, for each data slice, a performance measurement of each machine learning prediction model of the plurality of machine learning prediction models over the data slice. Said computing may be performed based on an application of each machine learning prediction model on each testing data instance that is mapped to the data slice, whereby computing for each data slice a set of different performance measurements, each of which measures a performance of a different machine learning prediction model over the data slice. The method further comprises determining, for each data slice, a selected machine learning prediction model from the plurality of machine learning based on the set of different performance measurements of the each data slice. In response to obtaining a data instance for which a label is to be estimated by the system, the method comprises determining a data slice to which the data instance is mapped; and utilizing the selected machine learning prediction model determined for the data slice for providing an estimated label for the data instance.

Yet another exemplary embodiment of the disclosed subject matter is a computer program product comprising a non-transitory computer readable storage medium retaining program instructions, which program instructions when read by a processor, cause the processor to perform a method comprising: obtaining a functional model representing system requirements of a system utilizing a machine learning prediction model. The machine learning prediction model may be configured to provide an estimated prediction based on a valuation of a feature vector. The functional model may comprise a set of attributes, each of which having a respective domain of values. The set of attributes may comprise at least one metadata-based attribute that is not comprised in the feature vector. The method further comprises determining a set of data slices based on the functional model. Each data slice of the set of data slices may be associated with a different valuation of one or more attributes of the functional model. The method further comprises obtaining testing data instances. Each testing data instance may comprise raw data and a label. The raw data comprise metadata. The method further comprises determining, for each testing data instance, based on the raw data, values for each attribute of the functional model. Said determining the values may comprise utilizing the metadata of the testing data instance, whereby mapping the testing data instance to one or more data slices. The method further comprises computing, for each data slice, a performance measurement of the machine learning prediction model over the data slice. Said computing may be based on an application of the machine learning prediction model on each testing data instance that is mapped to the data slice, whereby computing for each data slice a different performance measurement. The method further comprises determining whether the machine learning prediction model adheres to a target performance requirement based on the performance measurements of the data slices.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
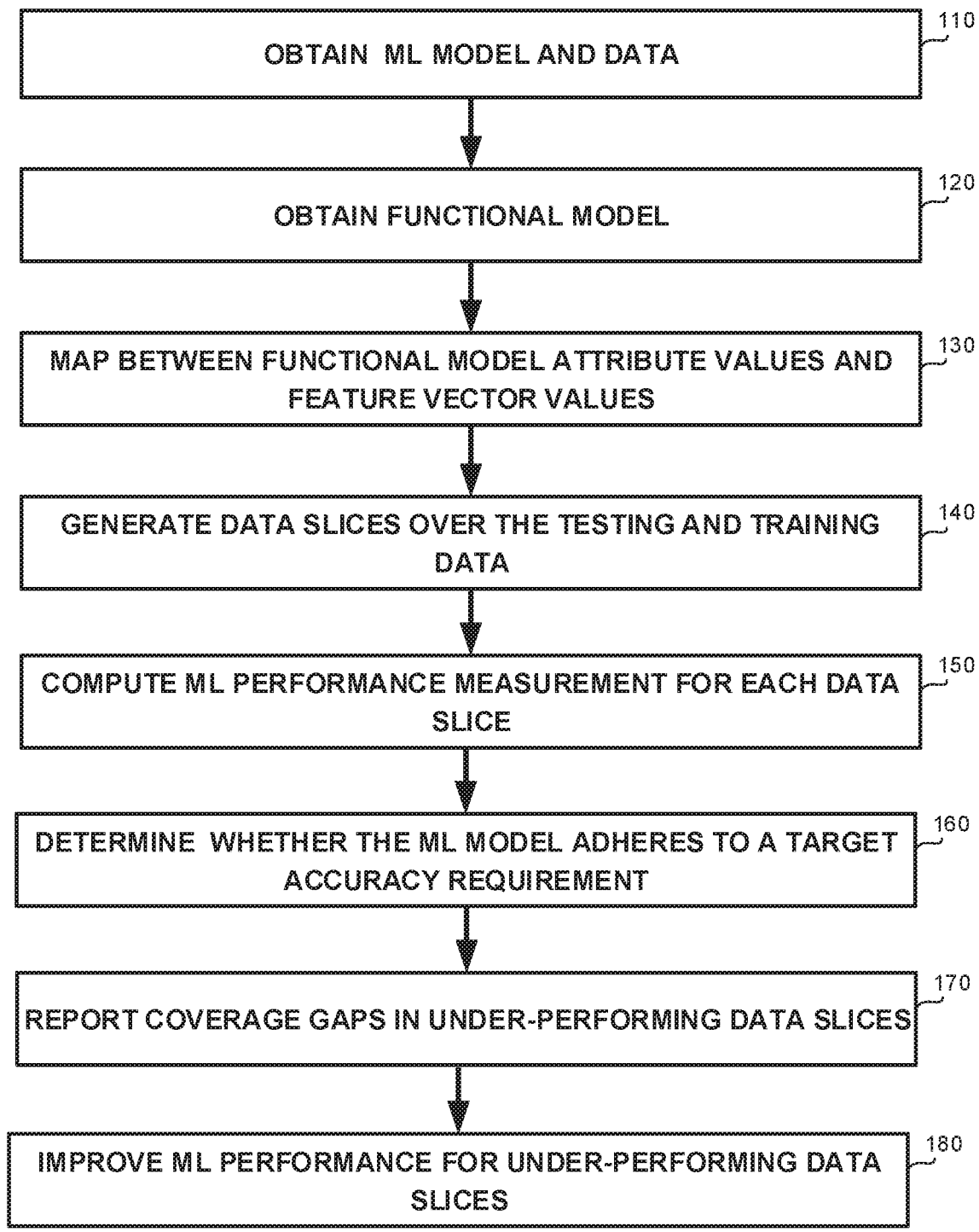
FIGS. 1A-1B show flowchart diagrams of a method, in accordance with some exemplary embodiments of the disclosed subject matter.

One technical problem dealt with by the disclosed subject matter is to provide suitable approaches for testing the quality of machine learning prediction models.

In some exemplary embodiments, machine learning models may be inherently incomplete. Machine learning models may only guarantee a statistically correct answer. Testing machine learning models may be performed based on machine learning metrics such as F1-score, accuracy, or the like. Such testing of machine learning models may ignore classical quality questions such as how to properly cover all business requirements of the machine learning model, how to detect what business areas are inadequately tested, or the like. This may result in a gap between machine learning models and their business requirements. As an example, the training data utilized to train the machine learning model may be biased against a group of certain features, such as attacking police officers analysis may be biased against male black people. When also the testing data as biased similarly, the performance measurement of the machine learning model may be mistakenly high. In order to assure the quality of such machine learning model, the training and the testing data may be required to comprise both true and false examples of black men, true and false examples of white men, true and false examples of Asians, Hispanics, or the like. As another example, in order to insure the quality of a machine learning prediction model for analysing photos, the training data may be required to work both on day and night photographs.

Another technical problem dealt with by the disclosed subject matter is to improve the machine learning performance with respect to business requirement of the model. In some exemplary embodiments, a low performance determined in testing the quality of machine learning prediction models may be a result of gaps, resulting in missing or insufficient training data. Covering such gaps may be required in order to improve the machine learning performance One technical solution is to adapt test planning methodologies of classical software aimed at ensuring coverage of requirements, to handle machine learning models. The methodologies may be utilized to determine whether a machine learning prediction model adheres to a target performance requirement that covers also business requirements of the machine learning model that may not be covered by the feature vector of the machine learning model. Such determination may be performed by determining performance measurements of data slices that are determined based on the business requirements.

In some exemplary embodiments, methodologies and technologies from test planning of classical software aimed at ensuring coverage of requirements, may be adapted to handle machine learning models. As an example, combinatorial testing and its modeling methodology may be utilized to detect weak business areas of the machine learning model and strengthen them. Combinatorial testing may be a testing technique that achieves a small and effective test plan. Combinatorial testing may provide an o empirical observation that the occurrence of a bug depends on the interaction between a small number of features of the Software Under Test (SUT).

In some exemplary embodiments, combinatorial testing technique may translate testing observation to a coverage criterion. A manual definition of the test space in the form of a combinatorial model may be performed. The manual definition may comprise a set of parameters, their respective values, and constraints on value combinations. A valid test in the test space may be defined to be an assignment of one value to each parameter that satisfies the constraints. A combinatorial testing algorithm may automatically construct a test plan the covers all valid value combinations of every subset of parameters. The test plan may be a subset of the set of valid tests, that may achieve a 100% coverage of the parameter value combinations. In some exemplary embodiments, a combinatorial modeling methodology may be used to detect areas of business requirements where the machine learning model may not have enough training data, may not perform as well as expected, or the like.

In some exemplary embodiments, the business requirements may vary in the level of domain knowledge and details that they capture. As an example, one business requirement may be a requirement to support data from varied sources, such as a text summarization solution that is required to work for documents coming from online forums, scientific experiment reports, news reports, or the like. As another example, a business requirement may be that the machine learning model works for a set of natural languages. Yet another example may be a requirement to handle at least a minimal percentage of non-dictionary words in the documents. It may be noted that in some cases, business requirements may not appear as features in the machine learning model training data or testing data. Instead, business requirements may be defined as abstractions over these features.

In some exemplary embodiments, the combinatorial model may connect business requirements and testing data, by requiring each combinatorial testing model parameter to be mapped to the machine learning model features. Each data slice in the testing data may be represented as a parameter value combination in the combinatorial testing model (i.e., a test in the classical software terminology). The tests may be defined as data subsets or slices over the machine learning model according to a combinatorial testing model parameter values and interaction levels, representing the requirements. The test results for each slice are computed over the corresponding machine learning model data by applying the machine learning model performance metric. It may be appreciated that the machine learning model solution data may be the training data or the testing data, depending on the solution life cycle, from development to pre-deployment.

In some exemplary embodiments, a set of data slices may be determined over the testing data. The data slices may be determined using the mapping between combinatorial testing model parameters and machine learning model features. In some exemplary embodiments, a coverage goal may be defined by the user as a t-way interaction coverage requirement. The coverage goal may be determined as a parameter t defining the number of attribute combinations for evaluation of the testing data instances, such as 1 attribute, 2 attributes, 5 attributes, or the like. The coverage goal may induce a division of the testing data into slices. Each data slice may correspond to a specific value combination of size t and may comprise all data records that map to that specific value combination. It may be noted that the number of data slices may be equal to the number of t-way value combinations in the CT model. The slices may not be disjoint, since each data record maps to multiple value combinations of size t, reflecting different business requirements that data record captures.

In some exemplary embodiments, coverage gap analysis of the testing data associated with each data slice may be performed. Data slices with no enough corresponding testing data instances, may expose business areas in which the machine learning solution may likely under-perform. A performance measurement of the machine learning prediction model may be computed over each data slice that has a sufficient number of testing data instances or support. A negative performance measurement may be assigned for data slices with no corresponding testing data instances, or with a number of testing data instances below a predetermined threshold, such as above 10 testing data instances, above 20 testing data instances, above 100 testing data instances, or the like. A determination whether performance measurement of each data slice being within the confidence interval or above a provided threshold of the machine learning performance metric over the entire data may be performed. If a data slice with a performance measurement below the performance measurement of the machine learning model over the entire data, that data slice may be highlighted as indicative of business requirements that are not well addressed by the machine learning production model.

Another technical solution is to improve the machine learning performance, by working with multiple machine learning models for different data slices, instead of a single machine learning model that has the best average performance. Variant machine learning models may strengthen weak business areas of the single machine learning model. In some exemplary embodiments, after using the slicing methodology, data slices which the machine learning model under-performs may be detected. Coverage gaps underperforming slices may be identified in the machine learning model. Changes to the machine learning model may be performed to improve the quality thereof in the underperformed data slices.

In some exemplary embodiments, a variant of the machine learning model may be selected for each data slice. The variant may be defined by different values of hyperparameters, such that the machine learning performance of the machine learning model variant over the data slice may be closer to the expected overall machine learning performance.

One technical effect of utilizing the disclosed subject matter is gaining insights about the machine learning model for different types of inputs. The disclosed subject matter identifies weak business requirement areas of machine learning solutions. The weak business requirement areas may be identified based on methods adapted from classical software testing, even in case the training data may not comprise examples of such areas. The disclosed subject matter identifies areas where the machine learning model cannot be relied upon. The disclosed subject matter may be utilized in the development stage of the machine learning model lifecycle, by suggesting additional training data or the inclusion of multiple machine learning model variants as part of the overall machine learning model. The disclosed subject matter may also assist in directing the labeling effort to areas that would best cover the business requirements. The disclosed subject matter may be effective from the very early stages of designing a machine learning model, to ensure that the resulting system addresses its requirements and provides its intended value.

Another technical effect of utilizing the disclosed subject matter is improving the machine learning performance over data slices, by working with multiple machine learning models, differentiated by the value of their hyper-parameters. Using disclosed subject matter, different variants may be recommended for operation, depending on the data slice that an incoming input data record maps to, based on its feature values. Mapping business requirements to machine learning performance may be essential not only for gaining insights about the machine learning model, but may also suggest action items. The actions may be at the system level, such as identifying, based on the feature space, input that the system should not be trusted with, at the training level, such as identifying the need for more data while indicating the desired feature values for the additional data records, at the system design level, suggesting a hybrid solution approach that may include non-learning parts or multiple machine models to improve the system quality over the underperforming slices, or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, a machine learning prediction model may be obtained. In some exemplary embodiments, the machine learning prediction model may be utilized by a system to provide an estimation for a valuation of a feature vector. Additionally or alternatively, an expected performance and threshold such as confidence interval of the machine learning prediction model may be obtained. Additionally or alternatively, testing and training data of the machine learning prediction model may be obtained. The testing and training data may be labeled data. Additional metadata may be obtained. The testing and training data may comprise data instances of the machine learning prediction model.

Each data instance may comprise raw data and a label. The raw data may comprise metadata. It is noted that the raw data may be the obtained data in its original form, without any processing, such as obtained from the sensors. Additionally or alternatively, the raw data may be processed sensor data, that includes processed features and metadata o that is not used to compute feature values that are fed into the machine learning prediction model. In some cases, the raw data in accordance with the disclosed subject matter may comprise the ML feature values together with metadata parameter values that are relevant for the system-level requirements.

As an example, a Kaggle™ loan classifier may be obtained. The classifier for is loan status, the current status of the loan, such as fully-paid, current, late, or the like, may be trained utilizing past loan approval data. The classifier may be trained to optimize an F1-score thereof, the harmonic average of precision (e.g., number of correct positive results divided by the number of all positive results returned by the classifier), recall (e.g., number of correct positive results divided by the number of all samples that should have been identified as positive), or the like. The raw data and features utilized to train the classifier may comprise the Kaggle™ lending club loan data. The raw data may comprise the complete loan data for loans issued in precious years, the loan status, the latest payment information, or the like. The Kaggle™ Loan machine learning model (e.g., classifier) may be trained based on the Kaggle™ lending club loan data. The same raw data may be utilized as testing data. As an example, one feature may be the installment, e.g., the monthly payment owed by the borrower if the loan originates. Another feature may be the loan amount, e.g., the listed amount of the loan applied for by the borrower. Yet other features may be home ownership, the employment length in years, purpose, or the like.

In some exemplary embodiments, an expected performance of the machine learning prediction model may be obtained, such as a score with a confidence interval. The score may comprise standard measures for machine learning performance of a classifier, such as F1-score as to capture both precision and recall in a single number, or the like. As an example, the Kaggle™ Loan machine learning model may be a Random Forest predicting 10 classes that are the 10 different categories of loan status in the Kaggle™ loan data. The Random Forest model may be configured to give average results over all the classes of: precision about 0.98, recall about 0.99, F1-score about 0.98, and overall support (number of data records used for the computation) about 177476.

On Step 120, a functional model representing system requirements of the system may be obtained. In some exemplary embodiments, the functional model may comprise a set of attributes, each of which having a respective domain of values. The set of attributes may comprise at least one metadata-based attribute that is not comprised in the feature vector of the machine learning prediction model. In some exemplary embodiments, the functional model may be configured to capture the business requirements of the system that may not appear as features in the machine learning prediction model. The business requirements may appear in the metadata of the testing data. Metadata-based attributes may be an abstraction over data features. Metadata-based attributes may not be used for learning. Metadata-based attributes may be used for computing the test results, the machine learning performance measurement over each of the data slices per, the valuation of each data instance at the desired interaction level, or the like.

It may be appreciated that various sources may be used as input for creating the functional model, such as data domains, data sources, requirement documents, test artifacts, expert knowledge, or the like. Additionally or alternatively, the functional model may be defined based on the business requirements that can be defined as abstractions over the data feature, based on the metadata, or the like.

As an example, a functional model may be defined over the Kaggle™ lending club loan data. The set of attributes may comprise features of the machine learning prediction model as is, such as home ownership having the values of rented, owned, mortgage, or other, the employment length in years having 12 different values (1-12), purpose of the load, having 14 different values, or the like. The set of attributes may also comprise abstractions of one or more features, such as a loan risk with three values of low, high and med that may be determined based on the loan amount feature and the installment feature, or the like.

Additionally or alternatively, the functional model may comprise a set of constraints on the attributes. Each constraint may define a restriction on values combinations of at least two attributes the functional model. A constraint on the loan risk attribute and a loan sum attribute may be defined. The loan sum lower than 25% of the loan amount may be associated with low loan risk, and loan sum higher than 90% of the loan amount may be associated with high risk. As a result, the constraint may be that low loan sum may not be associated with high loan risk.

On Step 130, a mapping between the functional model attribute values and the data feature values may be defined. In some exemplary embodiments, each testing data instance can be represented as attribute value combination in the functional model. For each testing data instance, values for each attribute of the functional model may be determined based on the raw data. The metadata of the testing data instance may be utilized to determine values of the attributes. As an example, 2-way interactions resulting from the Kaggle™ Loan computational model may be computed.

It may be important to define the functional model attributes such that they not only capture requirements, but also map to the machine learning model training data feature space. This is because the training or testing data of the machine learning model may be used for computing the performance of each data slice.

On Step 140, data slices may be generated over the testing and training data. The testing and training data may be sliced into data slices based on the mapping of Step 130. In some exemplary embodiments, the testing and training data of the machine learning prediction model may be sliced according to different interaction levels. Each testing data instance may be mapped to one or more data slices, in accordance with the functional model attribute values combinations associated therewith.

In some exemplary embodiments, a coverage goal may be obtained. The coverage goal may be determined by a user. The coverage goal may define the level of interaction between attributes of the functional model, such as 1-way, 2-way, and 3-way interaction levels, or the like. As the testing data is given and not synthesized, the higher the interaction level the less probable it is that there will be sufficient data for that interaction level. For each interaction level t, a set of all value combinations of size t that appear in some test in the functional model may be determined.

Additionally or alternatively, determining the data slices may be performed based on the set of constraints on the attributes of the functional model. Each data slice may be associated with a valuation of the one or more attributes of the functional model that satisfies the set of constraints.

In some exemplary embodiments, for each value combination a corresponding data slice may be generated, using the mapping between feature values and attribute values.

Each data slice may be associated with a different valuation of one or more attributes of the functional model.

On Step 150, a performance measurement of the machine learning prediction model over each data slice may be computed. The computation of the performance measurement may be performed based on an application of the machine learning prediction model on each testing data instance that is mapped to the data slice.

In some exemplary embodiments, the performance measurement may be configured to measure the performance of the model, based on the classification accuracy. Additionally or alternatively, the performance measurement may be an evaluation of the accuracy of the machine learning prediction model along with other metrics such as logarithmic loss, confusion matrix, area under curve, f1-score, mean absolute error, mean squared error, or the like.

Additionally or alternatively, a number of testing data instances that are mapped to the data slice may be computed. In response to determining that the number of testing data instances that are mapped to a data slice is below a predetermined threshold (such as about 10, about 20 or the like), a negative performance measurement may be assigned to the data slice. A negative performance measurement may be indicative of the inability of the prediction model to provide an estimated prediction to data instances mapped to this data slice.

On Step 160, the performance measurement of each data slice may be checked to determine whether the machine learning prediction model adheres to a target performance requirement. In some exemplary embodiments, data slices whose performance is outside the expected range considering the overall machine learning performance may be detected.

It may be noted that since data slices correspond to the functional model value combinations, they may be configured to point to the exact business areas in which the machine learning prediction model is under-performing.

On Step 170, under-performing data slice may be reported. In some exemplary embodiments, if the number of test data instances in a data slice is below a predetermined threshold, the data slice may be reported as a coverage gap.

On Step 180, the computation results may be utilized to improve the machine learning performance for under-performing data slices. In some exemplary embodiments, machine learning model variants of the machine learning prediction model may be determined. Machine learning model variants may differentiate by their hyper-parameters values. The hyper-parameters values may be set based on the value of the metadata-based attributes of the under-performing data slice. The values of other attributed may be derived via training.

In some exemplary embodiments, when obtaining a data instance that is mapped to an under-performing data slice, the variant machine learning prediction model associated with the under-performing data slice may be utilized for providing an estimated prediction for the data instance. Additionally or alternatively, data slices with negative performance measurement to the data slice, may be indicative of few data instances mapped to such data slice. In such a case, testing data instances that are mapped to the data slice may be added to the testing data. Additionally or alternatively, an alert indicating inability to provide estimated prediction for data instances that are mapped to the data slice may be issued.

It may be appreciated that different actions may be performed to improve the machine learning performance. The actions may be at the system level, such as identifying, based on the feature space, input that the system should not be trusted with. Such action may be performed by identifying data instances that are mapped to under-performing data slices. Additionally or alternatively, the actions may be at the training level, such as identifying the need for more data while indicating the desired feature values for the additional data records. Additionally or alternatively, the actions may be at the system design level, such as suggesting a hybrid solution approach that may include non-learning parts or multiple machine models to improve the system quality over the under-performing slices, or the like.

In some exemplary embodiments, the functional model may provide actionable insights for improving the quality of the machine learning model under test. Coverage gaps may point at requirements that are not covered by the machine learning model. Under-performing slices or slices with a low support (e.g. with a low number of data instances mapped thereto) may be indicated as warning and may require further examination. Potential actions may be suggested according to the reason for the warning and the machine learning model.

In case of slices with a number of data instances mapped thereto below a predetermined threshold, data may be added per slice requirements. Additionally or alternatively, an inability to provide a prediction for an input mapped to this slice may be indicated. In case of under-performing slices with support that is too low may indicate requirements that the machine learning model does not address well. Data slices with acceptable performance but low support may be suspicious, as it might be the case that the machine learning performance may be unstable on such slices. On the other hand, data slices that have low support and exceptionally high performance may be also suspicious because given more support they may have lower performance Under-performing slices with sufficient support may indicate a problem with the machine learning model on the corresponding requirements. It may be advisable to not deploy the machine learning model for inputs that are mapped to such slices.

Figure 1B:
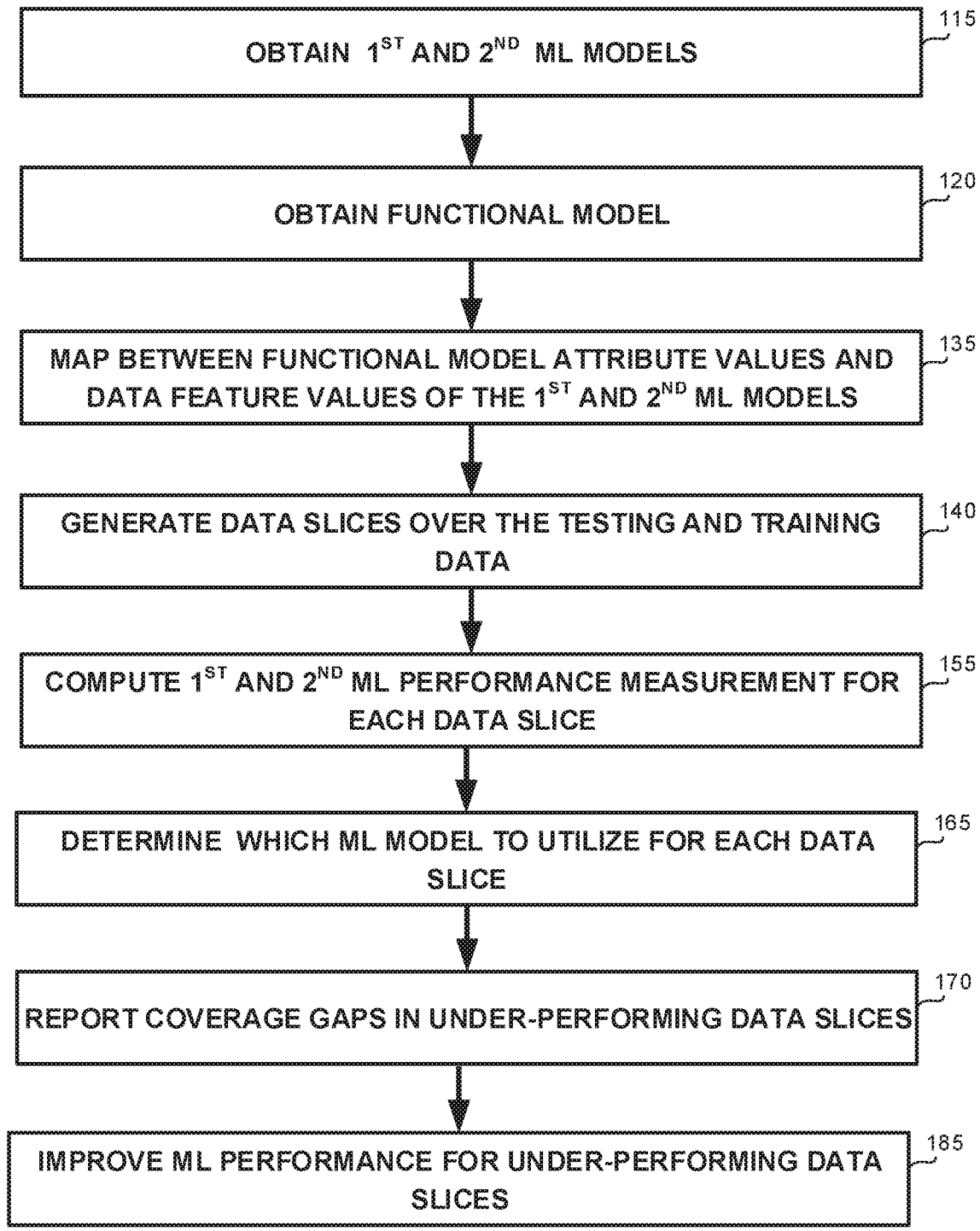

Referring now to FIG. 1B showing a flowchart diagram of a method, in accordance with some exemplary embodiments of the disclosed subject matter.

On Step 115, plurality of machine learning prediction models may be obtained. The plurality of machine learning prediction models may comprise a first and a second machine learning prediction models. In some exemplary embodiments, the first and the second machine learning prediction models may be utilized by a system to provide an estimation for a valuation of a feature vector. Different machine learning prediction models may be configured to provide estimated predictions based on valuations of different feature vectors. In some cases different machine learning prediction models may provide different estimated predictions for the same data instance, may have different performance, different confidence intervals of the machine learning prediction model, or the like. As an example, in a case of image annotation, different classifiers may be utilized for day and night images. The classifier that is configured to provide a high confidence classification in images captured in a day light may not perform well in night images or images captured in the dark.

Additionally or alternatively, testing data instances of the plurality of machine learning prediction model may be obtained. Each testing data instance may comprise raw data and a label.

In some exemplary embodiments, an expected performance of the machine learning may be obtained, such as a score with a confidence interval. The expected performance may be determined based on an expected performance of each of the plurality of machine learning prediction models.

On Step 120, a functional model representing system requirements of the system may be obtained. As an example, the functional model may comprise features of the machine learning prediction models as is, colors in certain pixel, image classification feature. Additionally or alternatively, the set of attributes may comprise attributes that determined based on the metadata, such as the type of the camera capturing the image, the time of the image, the angle of the light or the sun with respect to the camera, or the like.

On Step 135, a mapping between the functional model attribute values and the data feature values of the plurality of machine learning prediction models may be defined. Step 135 may be performed similarly to Step 130, with respect to each of the plurality of machine learning prediction models. It may be noted that since data slices correspond to the functional model value combinations, they may be configured to point to the exact business areas in which the machine learning prediction model is under-performing.

On Step 140, the testing data may be sliced into data slices based on the mapping of Step 135.

On Step 155, a performance measurement of each of the plurality of machine learning prediction models over each data slice may be computed. The computation of the performance measurement may be performed based on an application of each of the plurality of machine learning prediction models on each testing data instance that is mapped to the data slice. Additionally or alternatively, a negative performance measurement may be assigned to data slices with a number of testing data instances below a predetermined threshold.

On Step 165, for each data slice, the machine learning model with the highest performance measurement may be selected to be applied for the data slice. In some exemplary embodiments, different machine learning prediction models may be selected for different data slices. As an example, the day image annotation classifier may be selected for data slices with images captured at the morning, while the night image annotation classifier may be selected for data slices with images captured at midnight. The day image annotation classifier may be selected for data slices with images captured during the sunset when the sun is at certain angles, while the night image annotation classifier may be selected for data slices with images captured during the sunset when the sun is at different angles.

Additionally or alternatively, the machine learning model with the highest performance measurement may be checked to determine whether the machine learning prediction model adheres to a target performance requirement. In some exemplary embodiments, data slices whose performance is outside the expected range considering the overall machine learning performance may be detected.

On Step 185, the computation results may be utilized to improve the machine learning performance for under-performing data slices. In some exemplary embodiments, machine learning model variants of the plurality of machine learning prediction models may be determined. Machine learning model variants may differentiate by their hyper-parameters values. The hyper-parameters values may be set based on the value of the metadata-based attributes of the under-performing data slice. A variant machine learning prediction model may be determined for each machine learning prediction model, and a new selection of the best machine learning for the data slice may be performed.

Figure 2A:
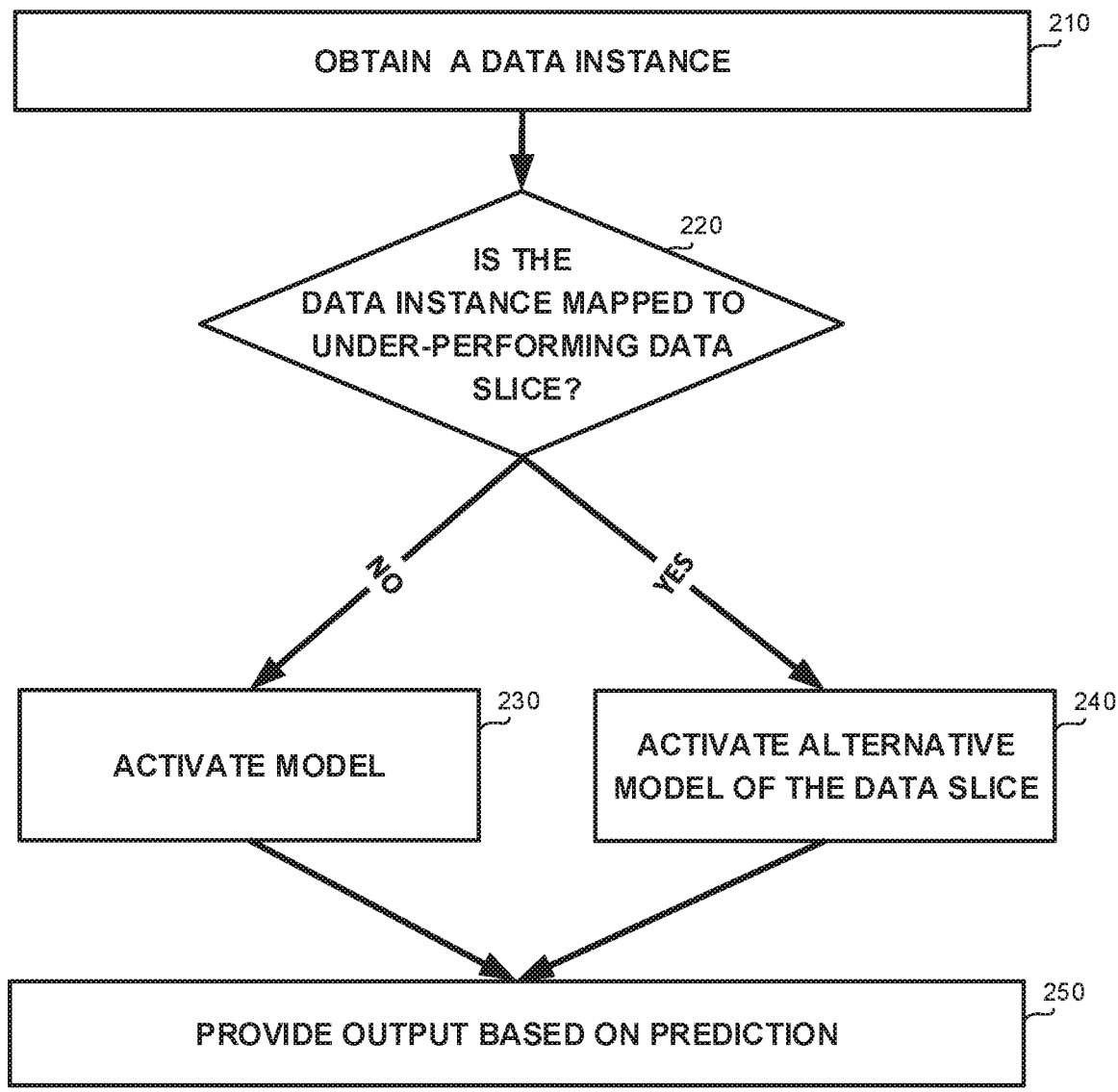
FIG. 2A-2C show flowchart diagrams of a method, in accordance with some exemplary embodiments of the disclosed subject matter.

Referring now to FIG. 2A showing a flowchart diagram of a method, in accordance with some exemplary embodiments of the disclosed subject matter.

On Step 210, a data instance may be obtained. In some exemplary embodiments, the data instance may be planned to be provided to a machine learning prediction model to provide an estimated prediction based on a valuation of a feature vector of the data instance.

On Step 220, a determination whether the data instance is mapped to an underperforming data slice may be performed. In some exemplary embodiments, the data instance may be mapped to one or more data slices, in accordance with the functional model attribute values combinations associated therewith. Under-performing data slices may be indicative that the system performance can be neither determined nor trusted for io coverage gaps.

On Step 230, in response to determining that the data instance is not mapped to an underperforming data slice, the machine learning prediction model may be utilized to provide a prediction for the data instance.

On Step 240, in response to determining that the data instance is mapped to an underperforming data slice, an alternative machine learning prediction model associated with the underperforming data slice may be utilized to provide a prediction for the data instance. The alternative machine learning prediction model may be defined by different values of hyper-parameters, such that the machine learning performance of the alternative machine learning prediction model over this data slice may be closer to the expected overall machine learning performance of the machine learning prediction model over other data slices. In some exemplary embodiments, the alternative machine learning prediction model may be automatically determined over the space of machine learning model variants, differentiated by their hyper-parameters values, to find the machine learning model variant that performs best on each of the under-performing data slices.

Additionally or alternatively, it may be possible to find a model variant, such as the same type of model with different hyper-parameters, that may perform better on such slices. It may be possible to determine which model to run based on the feature space of the incoming data record and its mapping to slices.

On Step 250, an output may be provided based on the prediction.

It may be appreciated that Steps 240-250 may be performed at the system design level, may be a portion of a hybrid solution approach that may include non-learning parts or multiple machine models to improve the system quality over the under-performing slices, or the like. The machine learning solution performance may be improved by working with multiple machine learning models instead of working with a single machine learning model that has the best average performance. Different variants may be recommended for operation, depending on the slice that an incoming input data record maps to, based on its feature values.

Figure 2B:
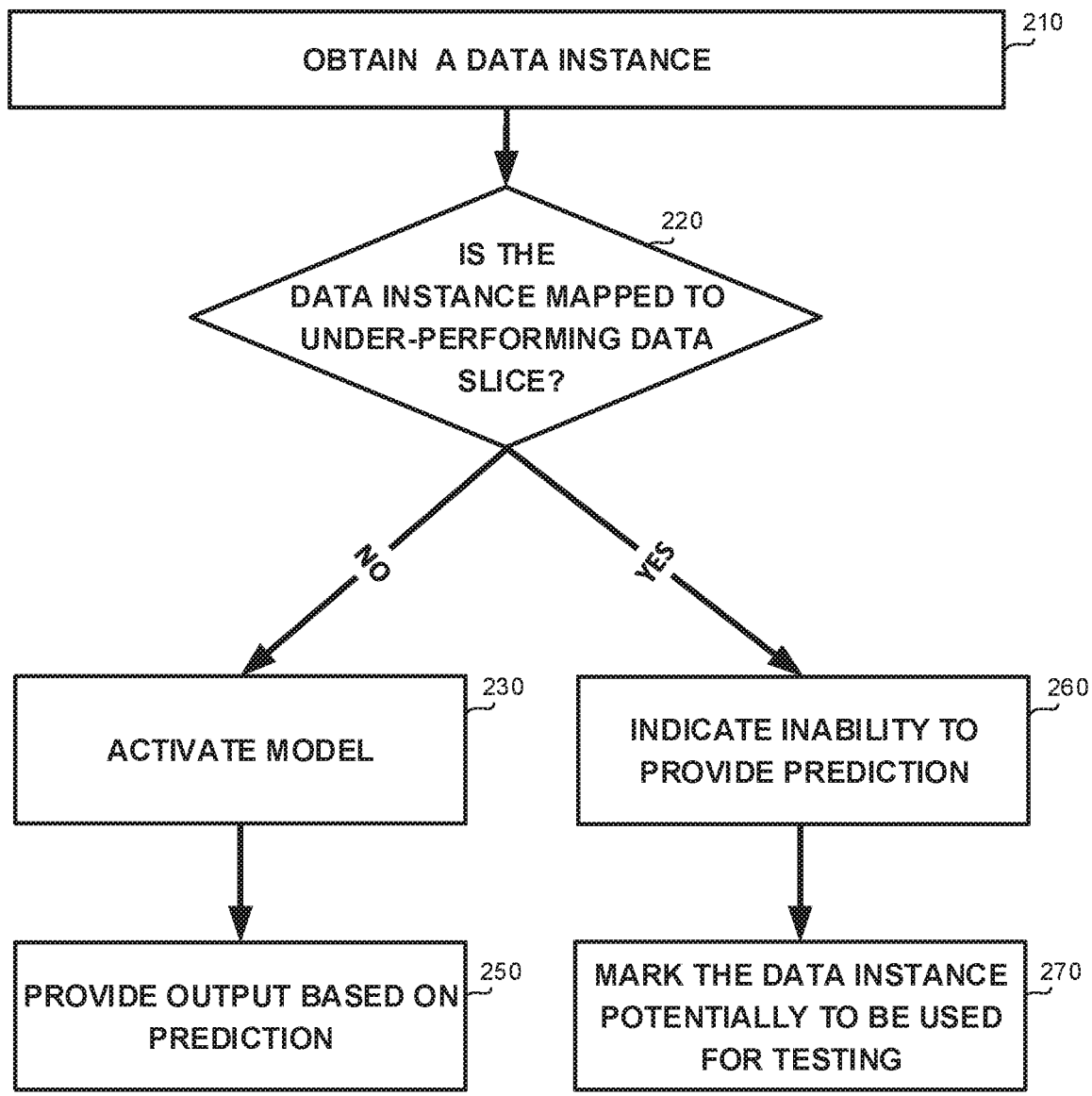

Referring now to FIG. 2B showing a flowchart diagram of a method, in accordance with some exemplary embodiments of the disclosed subject matter.

On Step 260, in response to determining that the data instance is mapped to an underperforming data slice, an indication of inability to provide prediction may be issued.

On Step 270, the data instance may be marked to potentially be used for testing. The data instances may be added to the testing data, as part of data records with the indicated interactions that are provided to under-performing data slices in order to be able to test the system's behavior over the underlying requirement. Adding training data, as specified by the slice parameter values, may improve the re-trained machine learning model performance.

Figure 2C:
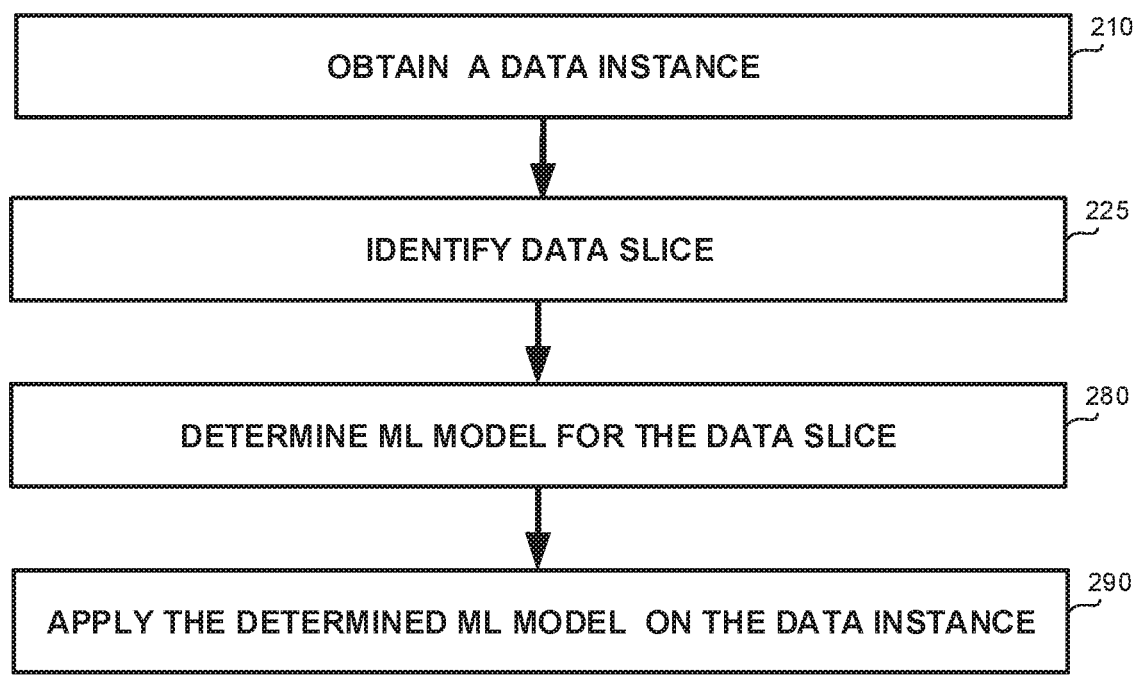

Referring now to FIG. 2C showing a flowchart diagram of a method, in accordance with some exemplary embodiments of the disclosed subject matter.

On Step 210, a data instance may be obtained. In some exemplary embodiments, the data instance may be planned to be provided to a machine learning prediction model to provide an estimated prediction based on a valuation of a feature vector of the data instance.

On Step 225, a data slice to which the data instance is mapped thereto may be identified. In some exemplary embodiments, the data instance may be mapped to one or more data slices, in accordance with the functional model attribute values combinations associated therewith. The mapping may be performed based on valuation of the set of attributes of a functional model with respect to the data instance.

On Step 280, a machine learning prediction model may be selected to the data slice. Step 280 may be similar to Step 165 in FIG. 1, may be a result of performing Steps 115-165, or the like. Additionally or alternatively, in response to determining that a performance measurement of the selected machine learning prediction model determined for a data slice is below a target performance requirement, a variant machine learning prediction model may be determined for the data slice. As an example testing data instances that are mapped to the data slice may be added and utilized for retraining the selected machine learning prediction model determined for the data slice. As another example, a variant machine learning model may be generated.

On Step 290, the selected machine learning prediction model of the data slice may be applied on the obtained data instance. Additionally or alternatively, in response to determining that a performance measurement of the selected machine learning prediction model determined for a data slice is below a target performance requirement, an inability to provide estimated prediction for the data instance may be reported.

Figure 3:
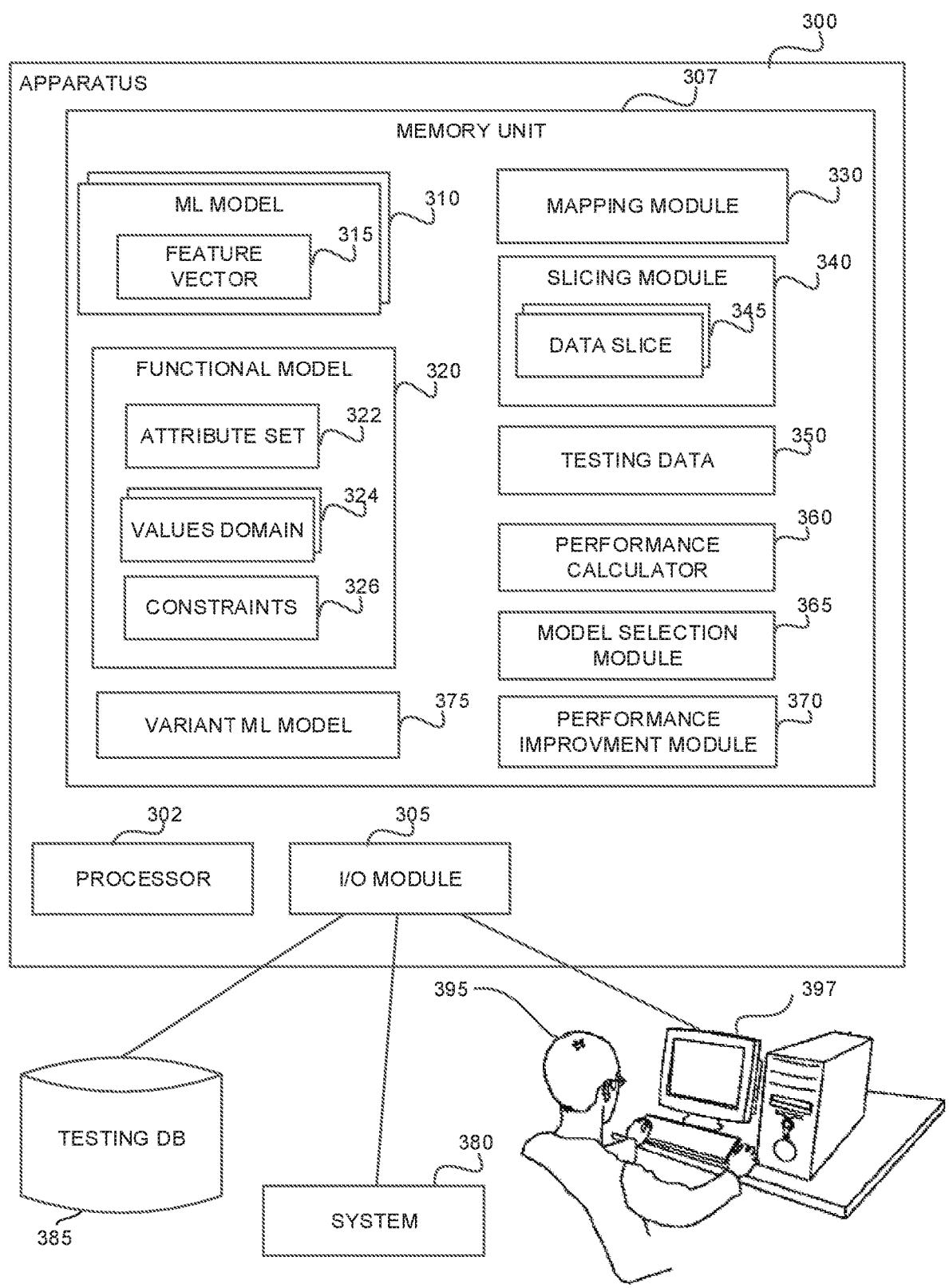
FIG. 3 shows a schematic illustration of an exemplary architecture, in accordance with some exemplary embodiments of the disclosed subject matter.

Referring now to FIG. 3 showing a block diagram of an apparatus, in accordance with some exemplary embodiments of the disclosed subject matter. An Apparatus 300 may be configured to support parallel user interaction with a real world physical system and a digital representation thereof, in accordance with the disclosed subject matter.

In some exemplary embodiments, Apparatus 200 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 200 or any of it subcomponents.

In some exemplary embodiments of the disclosed subject matter, Apparatus 300 may comprise an Input/Output (I/O) module 305. I/O Module 305 may be utilized to provide an output to and receive input from a user, such as, for example, machine learning parameters, features, metadata, raw data, data instances, performance requirements, coverage goals, algorithms parameters, attributes, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, one or more Machine Learning Models 320 may be utilized by a System 380 to provide an estimated prediction based on a valuation of a Feature Vector 315. In some exemplary embodiments, training data and Testing Data 350 may be utilized to train Machine Learning Model 320. Machine Learning Model 320 may be obtained from User 397. Machine Learning Model 320 may be in any life cycle of machine learning, from development to pre-deployment.

As an example, Machine Learning Model 320 may be configured to detect breast cancer in mammographic images and provide a prediction of malignant or benign for the tumor. Testing Data 350 may X-Ray mammographic images along with labels thereof.

In some exemplary embodiments, the image may be a mammographic image, which may be created using low-energy X-rays, to examine the human breast. Feature Vector 315 may comprise imaging and clinical features such as characteristic masses, micro calcifications, median ray level, gender, age, or the like.

In some exemplary embodiments, Functional Model 320 may be configured to represent system requirements of System 380. Functional Model 320 may comprise a set of Attributes 322, each of which having a respective domain of Values 324. Attributes 322 may comprise at least one metadata-based attribute that is not comprised Feature Vector 315. As an example, Attributes 322 may comprise gender, type of the medical imaging device, imaging modality, or the like. Additionally or alternatively, Functional Model 320 may comprise a set of Constraints 326 on Attributes 322. Each constraint may be defined on value combinations of at least two attributes of Functional Model 320. As an example, one constraint may be that for the value "male" of the attribute "gender", the attribute gestation may not be required.

In some exemplary embodiments, Slicing Module 340 may be configured to determine a set of Data Slices 345 based on Functional Model 320. Each of Data Slices 345 may be associated with a different valuation of one or more attributes of the Functional Model 320. Slicing Module 340 may be configured to determine the set of Data Slices 345 in accordance with Constraints 326. Each data slice may be associated with a valuation of Attributes 322 that satisfies Constraints 326. As an example, on data slice may be a slice of pregnant women of age 20-40.

In some exemplary embodiments, instances of Testing Data 350 may be obtained from Testing Database 385. Each instance of Testing Data 350 may comprises raw data and a label. Additionally or alternatively, metadata related to Testing Data 350 may be obtained from Testing Database 385.

In some exemplary embodiments, Mapping Module 330 may be configured to map each instance of Testing Data 350 to one or more Data Slices 345. Mapping Module 330 may be configured to determine, for each instance of Testing Data 350, based on the raw data, values for each Attribute 322 of Functional Model 322. Mapping Module 330 may be configured to utilize the metadata of the Testing Data 350. Additionally or alternatively, Mapping Module 330 may be configured to calculate combinations of values of the attributes with respect to a coverage goal determined by a user. Slicing Module 340 may be configured to utilize the coverage goal for determining the set of Data Slices 345.

In some exemplary embodiments, Mapping Module 330 may be configured to determining values for each Attribute 322 using metadata of Testing Data 350 to determine values for the at least one metadata-based attribute. It may be noted that the metadata may not be utilized for the valuation of Feature Vector 315.

In some exemplary embodiments, Performance Calculator 360 may be configured to compute, for each Data Slice 345, a performance measurement of Machine Learning Model 310 over the data slice. Performance Calculator 360 may be configured to run an application of Machine Learning Model 310 on each instance of Testing Data 350 that is mapped to the data slice. Additionally or alternatively, Performance Calculator 360 may be configured to determine whether Machine Learning Model 310 adheres to a target performance requirement based on the performance measurements of Data Slice 345. The target performance requirement may be defined by User 395, obtained from System 380, Database 385, or the like. Additionally or alternatively, in a case of multiple Machine Learning Models 310, Performance Calculator 360 may be configured to compute, for each Data Slice 345, a performance measurement of each Machine Learning Model 310 over the data slice.

Additionally or alternatively, Performance Calculator 360 may be configured to determine, for each data slice, a number of testing data instances that are mapped to the data slice. Performance Calculator 360 may be configured to assign a negative performance measurement to data slices with a number of testing data instances mapped thereto below a predetermined threshold. The predetermined threshold may be determined by User 395, or based on requirements of System 380.

In some exemplary embodiments, in response to determining that a performance measurement of a data slice is below the target performance requirement, Performance Improvement Module 370 may be configured to determine a Variant Machine Learning Model 375 for the data slice. In response to obtaining a data instance to be estimated, Variant Machine Learning Model 375 may be utilized for providing an estimated prediction for the data instance that is mapped to the data slice. Additionally or alternatively, Performance Improvement Module 370 may adding testing data instances that are mapped to the data slice to train Machine Learning Model 310; indicating inability to provide estimated prediction for data instances that are mapped to the data slice, or the like.

In some exemplary embodiments, Model Selection Module 365 may be configured to determine, for each data slice, which machine learning model of the one or more Machine Learning Models 320 to utilize to provide the estimated prediction. Model Selection Module 365 may select the machine learning model with the performance measurement determined by Performance Calculator 360 for the data slice. The selected machine learning model may be utilized to provide predictions for data instances that are mapped to the data slice.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a functional model representing system requirements of a system utilizing a machine learning prediction model, wherein the machine learning prediction model is configured to provide an estimated prediction based on a valuation of a feature vector, wherein the functional model comprises a set of attributes, each of which having a respective domain of values, wherein the set of attributes comprises at least one metadata-based attribute that is not comprised in the feature vector;
   determining a set of data slices based on the functional model, wherein each data slice of the set of data slices is associated with a different valuation of one or more attributes of the functional model;
   obtaining testing data instances, wherein each testing data instance comprises raw data and a label, wherein the raw data comprise metadata;
   for each testing data instance, determining, based on the raw data, values for each attribute of the functional model, wherein said determining the values comprises utilizing the metadata of the testing data instance, whereby mapping the testing data instance to one or more data slices;
   computing, for each data slice, a performance measurement of the machine learning prediction model over the data slice, wherein said computing is based on an application of the machine learning prediction model on each testing data instance that is mapped to the data slice, whereby computing for each data slice a different performance measurement; and
   determining whether the machine learning prediction model adheres to a target performance requirement based on the performance measurements of the data slices.

2. The method of claim 1, further comprising:
   obtaining a coverage goal determined by a user;
   wherein said determining the set of data slices is performed based on the coverage goal.

3. The method of claim 1, further comprising:
   in response to determining that a performance measurement of a data slice is below the target performance requirement, determining a second machine learning prediction model for the data slice;
   wherein in response to obtaining a data instance to be estimated,
      determining that the data instance is mapped to the data slice; and
      utilizing the second machine learning prediction model for providing an estimated prediction for the data instance.

4. The method of claim 1, wherein the functional model further comprises a set of constraints on the attributes, each of which defines a constraint on value combinations of at least two attributes of the functional model; wherein said determining the set of data slices is performed based on the set of constraints, whereby each data slice is associated with a valuation of the one or more attributes of the functional model that satisfies the set of constraints.

5. The method of claim 1, wherein said computing comprises determining, for each data slice, a number of testing data instances that are mapped to the data slice, wherein in response to determining that the number of testing data instances that are mapped to a data slice is below a predetermined threshold, providing a negative performance measurement with respect to the data slice.

6. The method of claim 5, wherein in response to providing the negative performance measurement to the data slice, performing at least one of:
adding testing data instances that are mapped to the data slice; and
indicating inability to provide estimated prediction for data instances that are mapped to the data slice.

7. The method of claim 1, wherein said determining values for each attribute of the functional model comprises utilizing the metadata of the testing data instance to determine values for the at least one metadata-based attribute, wherein the metadata is not utilized for the valuation of the feature vector of the machine learning prediction model.

8. A method comprising:
obtaining a functional model representing system requirements of a system, wherein the system is capable of utilizing a plurality of machine learning prediction models, each of which is configured to provide an estimated prediction based on a valuation of a feature vector, wherein the functional model comprises a set of attributes, each of which having a respective domain of values, wherein the set of attributes comprises at least one metadata-based attribute that is not comprised in the feature vector;
determining a set of data slices based on the functional model, wherein each data slice of the set of data slices is associated with a different valuation of one or more attributes of the functional model;
obtaining testing data instances, wherein each testing data instance comprises raw data and a label, wherein the raw data comprises metadata;
for each testing data instance, determining, based on the raw data, values for each attribute of the functional model, wherein said determining the values comprises utilizing the metadata of the testing data instance, whereby mapping the testing data instance to one or more data slices;
computing, for each data slice, a performance measurement of each machine learning prediction model of the plurality of machine learning prediction models over the data slice, wherein said computing is based on an application of each machine learning prediction model on each testing data instance that is mapped to the data slice, whereby computing for each data slice a set of different performance measurements, each of which measures a performance of a different machine learning prediction model over the data slice;
determining, for each data slice, a selected machine learning prediction model from the plurality of machine learning based on the set of different performance measurements of the each data slice;
wherein in response to obtaining a data instance for which a label is to be estimated by the system,
determining a data slice to which the data instance is mapped; and
utilizing the selected machine learning prediction model determined for the data slice for providing an estimated label for the data instance.

9. A computer program product comprising a non-transitory computer readable storage medium retaining program instructions, which program instructions when read by a processor, cause the processor to perform a method comprising:
obtaining a functional model representing system requirements of a system utilizing a machine learning prediction model, wherein the machine learning prediction model is configured to provide an estimated prediction based on a valuation of a feature vector, wherein the functional model comprises a set of attributes, each of which having a respective domain of values, wherein the set of attributes comprises at least one metadata-based attribute that is not comprised in the feature vector;
determining a set of data slices based on the functional model, wherein each data slice of the set of data slices is associated with a different valuation of one or more attributes of the functional model;
obtaining testing data instances, wherein each testing data instance comprises raw data and a label, wherein the raw data comprise metadata;
for each testing data instance, determining, based on the raw data, values for each attribute of the functional model, wherein said determining the values comprises utilizing the metadata of the testing data instance, whereby mapping the testing data instance to one or more data slices;
computing, for each data slice, a performance measurement of the machine learning prediction model over the data slice, wherein said computing is based on an application of the machine learning prediction model on each testing data instance that is mapped to the data slice, whereby computing for each data slice a different performance measurement; and
determining whether the machine learning prediction model adheres to a target performance requirement based on the performance measurements of the data slices.

10. The computer program product of claim 9, wherein said method further comprises: obtaining a coverage goal determined by a user;
wherein said determining the set of data slices is performed based on the coverage goal.

11. The computer program product of claim 9, wherein said method further comprises:
in response to determining that a performance measurement of a data slice is below the target performance requirement, determining a second machine learning prediction model for the data slice;
wherein in response to obtaining a data instance to be estimated,
determining that the data instance is mapped to the data slice; and
utilizing the second machine learning prediction model for providing an estimated prediction for the data instance.

12. The computer program product of claim 9, wherein the functional model further comprises a set of constraints on the attributes, each of which defines a constraint on value combinations of at least two attributes of the functional model; wherein said determining the set of data slices is performed based on the set of constraints, whereby each data slice is associated with a valuation of the one or more attributes of the functional model that satisfies the set of constraints.

13. The computer program product of claim 9, wherein said computing comprises determining, for each data slice, a number of testing data instances that are mapped to the data slice, wherein in response to determining that the number of testing data instances that are mapped to a data slice is below a predetermined threshold, providing a negative performance measurement with respect to the data slice.

14. The computer program product of claim 13, wherein in response to providing the negative performance measurement to the data slice, performing at least one of:
   adding testing data instances that are mapped to the data slice; and
   indicating inability to provide estimated prediction for data instances that are mapped to the data slice.

15. The computer program product of claim 9, wherein said determining values for each attribute of the functional model comprises utilizing the metadata of the testing data instance to determine values for the at least one metadata-based attribute, wherein the metadata is not utilized for the valuation of the feature vector of the machine learning prediction model.

16. The computer program product of claim 9:
   wherein the system is capable of utilizing a plurality of machine learning prediction models comprising the machine learning prediction model, wherein each machine learning prediction model is configured to provide the estimated prediction based on a valuation of the feature vector;
   wherein the method further comprises:
   computing, for each data slice, a performance measurement of each machine learning prediction model of the plurality of machine learning prediction models over the data slice, wherein said computing is based on an application of each machine learning prediction model on each testing data instance that is mapped to the data slice, whereby computing for each data slice a set of different performance measurements, each of which measures a performance of a different machine learning prediction model over the data slice;
   determining, for each data slice, a selected machine learning prediction model from the plurality of machine learning based on the set of different performance measurements of the each data slice;
   wherein in response to obtaining a data instance for which a label is to be estimated by the system,
     determining a data slice to which the data instance is mapped; and
     utilizing the selected machine learning prediction model determined for the data slice for providing an estimated label for the data instance.

* * * * *